United States Patent [19]

Potter et al.

[11] 4,230,970
[45] Oct. 28, 1980

[54] METHOD AND APPARATUS FOR SAVING ENERGY

[75] Inventors: Gene B. Potter; Martin H. Jurick, both of Santa Ana, Calif.

[73] Assignee: Lear Siegler, Inc., Santa Monica, Calif.

[21] Appl. No.: 884,147

[22] Filed: Mar. 7, 1978

[51] Int. Cl.³ .................... G05F 1/00; H05B 37/02; H05B 39/04; H05B 41/36
[52] U.S. Cl. .................... 315/307; 315/310; 315/311; 315/DIG. 7; 307/234; 323/17; 323/19; 323/22 T; 363/23
[58] Field of Search .............. 315/307, 308, 310, 311, 315/DIG. 5, DIG. 7; 307/234; 328/141, 146; 323/17, 19, 22 T, 22 SC, 25; 363/27, 28, 73, 23, 24

[56] References Cited

U.S. PATENT DOCUMENTS

| | | | |
|---|---|---|---|
| 3,648,106 | 3/1972 | Engel et al. | 315/307 |
| 3,890,562 | 6/1975 | West | 315/311 |
| 3,898,549 | 8/1975 | Mitchell | 363/24 |
| 3,946,302 | 3/1976 | Kovalick et al. | 323/19 |
| 3,959,716 | 5/1976 | Gilbert, Jr. et al. | 323/22 T |
| 3,967,159 | 6/1976 | Dendy et al. | 315/308 |
| 3,999,100 | 12/1976 | Dendy et al. | 315/308 |
| 4,004,187 | 1/1977 | Walker | 363/24 |
| 4,039,897 | 8/1977 | Dragoset | 315/307 |
| 4,042,856 | 8/1977 | Steigerwald | 315/307 |
| 4,076,974 | 2/1978 | Gee | 323/19 |
| 4,093,908 | 6/1978 | Evans | 323/19 |

*Primary Examiner*—Saxfield Chatmon, Jr.
*Attorney, Agent, or Firm*—Edward J. DaRin

[57] ABSTRACT

A method and apparatus for regulating the output flux generated by a lamp with the degeneration of the voltage from a power source such as a battery. The regulating circuit maintains a constant luminous flux output from a lamp over a substantial range of voltages by switching the voltage to the lamp on and off at a preselected and controlled duty cycle. The power pulses applied to the lamp have heights that vary directly as the voltage variations of the power source and widths that vary as the inverse square of the voltage from the power source for maintaining a constant RMS voltage on the lamp and thereby constant light output flux.

12 Claims, 7 Drawing Figures

METHOD AND APPARATUS FOR SAVING ENERGY

REFERENCE TO RELATED APPLICATION

This application is an improvement over the copending application bearing Ser. No. 752,689 assigned to the same assignee as the present application now U.S. Pat. No. 4,156,166.

DISCLOSURE OF THE INVENTION

This invention relates to a method and apparatus for saving the energy of a power source and more particularly to regulating circuits for maintaining constant the root mean square, RMS, voltage output of a switching power supply despite variations in its supply voltage.

Barricade lights are commonly used on highways to warn motorists of hazardous conditions. They can be either flashing or steady-burn types of lights. The energy saving circuits disclosed herein have application to both types of barricade lights. These lights commonly use Lechanche type batteries, which must be replaced as they become depleted, and incandescent lamps.

In order to provide good visibility in barricade flashers, it is necessary to produce at least four candela of luminous flux. As power is drained from the battery, its terminal voltage decreases causing lamp light output to diminish. In order to produce four candela of luminous flux when battery voltage is low, i.e., 7.5 volts, it is necessary to accept the fact that the lamp will produce much more than four candela of luminous flux when the battery is fresh and its terminal voltage high, i.e., 12 volts. If the voltage supplied to the lamp could be maintained at the voltage value needed to produce four candela, as the terminal voltage decreases, the power that is wasted in producing more than four candela of light flux would be used to extend the useful life of the battery. Since batteries are expensive and must be replaced frequently, a means of saving energy or extending battery life, thereby decreasing the frequency of replacement is economically rewarding.

Regulation of lamp voltage also extends lamp life. The regulation of a lamp extends the life of a lamp by eliminating the high initial voltage characteristic of a fresh battery.

A regulating circuit of the above-described type is disclosed in the aforementioned copending patent application bearing Ser. No. 752,689 wherein there is disclosed a method and apparatus for regulating the source potential to permit the constant output light level to be efficiently produced over a wide range of source voltage. The regulating circuit disclosed in said copending application is generally satisfactory and produces regulation within 7 percent of the desired voltage. The circuit disclosed in said copending application, however, requires a number of large components to be utilized and therefore cannot be readily and economically constructed by means of integrated circuit technology. In view of the number of large components required for implementing such a circuit it becomes too expensive to construct the circuit in the form of an integrated circuit "chip" since the "chip" required is too large. Accordingly, there is a need at the present time for a regulating circuit of the above-mentioned type that will produce the desired regulation but that can be inexpensively constructed by means of integrated circuit techniques.

The present invention provides an improved regulation circuit for maintaining the root mean square, RMS, voltage across the load constant, within one percent, over a substantial range of source voltages. When the load is a lamp that is battery powered, a constant light flux output is produced by maintaining a constant RMS voltage to the lamp over a substantial range of battery voltages thereby reducing the frequency of battery replacement. This improved regulator circuit can be readily and inexpensively constructed by integrated circuit techniques. The provision of such a regulator circuit also extends the life of the lamps that are regulated by eliminating the high initial voltage effects.

From a broad method and apparatus standpoint, the present invention provides a regulating circuit to maintain a constant RMS voltage on the load by switchably applying power pulses to the load. The pulses are applied to the load so that the height of the pulse and the width of the pulse vary in accordance with the variations of the output voltages of the source voltage. In accordance with the present invention the height of the power pulse is directly related to the value of the output voltage of the power source, while the width of the pulse varies an inverse square of the output voltages from the source for maintaining the desired constant RMS voltage value. When the load device is a lamp, the lamp should have a voltage rating substantially equivalent to the lowest voltage level of the source that will sustain the desired light output and constant RMS voltage.

From an apparatus standpoint, the invention comprehends maintaining a substantially constant RMS voltage across a load device powered from a source having a decreasing output voltage with time. The apparatus includes means adapted to be coupled to the power source for generating pulses having a preselected repetition rate and pulse width and a means for producing a reference voltage having an inverse voltage relationship to the voltages provided by the source wherein the inverse relationship preferably has a substantially constant slope. The apparatus includes means for providing an oscillating signal having a preselected wave shape exhibiting reversals in direction regularly and continually with amplitudes varying around the level of reference voltage. The amplitudes of the oscillating signal varying with the changes in the output voltages of the power source. Comparison circuit means are coupled to be responsive to the output signals from the oscillating signal generator and from the reference voltage generator for providing output pulses having heights varying with the amplitude of the voltages from the power source and pulse widths that vary as the inverse square of the output voltages from the power sources. These pulses are coupled through switching means for application to the load or lamp to be energized therefrom.

These and other features of the present invention may be more fully appreciated when considered in the light of the following specification and drawings, in which.

Figure 1:
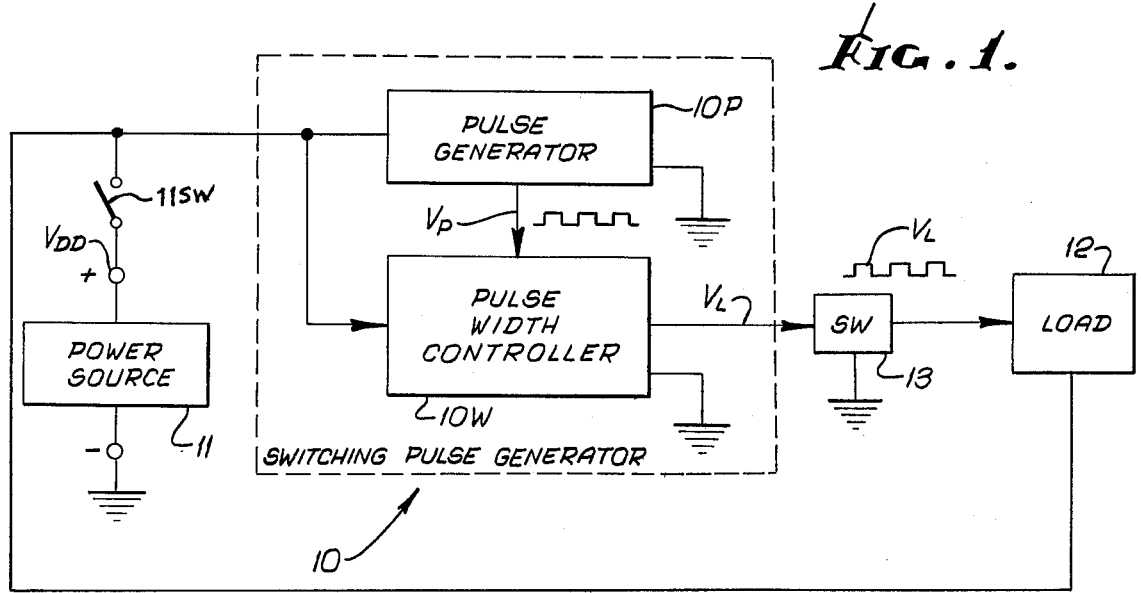
FIG. 1 is a generalized block diagram of the regulating circuit embodying the present invention.

Now referring to the drawings, the basic regulation concept of the present invention will be described in detail. The luminous flux output of a lamp can be maintained constant by regulating the root-mean-square, RMS, voltage applied to the lamp. If this voltage is in the form of a train of pulses of variable width and of pulse height equal to the applied voltage, then as the applied voltage decreases, the RMS lamp voltage will be maintained at a constant value if the pulse width varies as the inverse square of applied voltage, that is, $$a_2 = a_1(V_{DD1}/V_{DD2})^2 \quad (1)$$

where $a_1$ and $V_{DD1}$ are initial and $a_2$ and $V_{DD2}$ are final values of pulse width and applied voltage, respectively. For example, if the terminal voltage is 12 volts when the battery is fresh ($V_{DD1} = 12$) and the pulse width which is adjusted to be 25 percent of maximum duty cycle of 100 percent ($a = 0.25$) then when the battery terminal voltage has decreased to 6 volts ($V_{DD2}$ 32 6) the duty cycle must increase to 100 percent ($a = 1$) to maintain constant RMS voltage at the lamp.

The block diagram of FIG. 1 represents the circuit organization for implementing the basic regulation concept of the present invention. The regulator 10 illustrated in FIG. 1 is constructed to be powered from the power source 11 for periodically providing pulses to the load or lamp device 12. The coupling of the power source 11 to the regulator 10 is controlled by the switch 11SW. The pulses provided by the regulator 10 are proportioned for maintaining the RMS voltage applied to the load 12 constant over a substantial range of voltages from the power source 11. The switching pulses that are provided from the regulator 10 have a height that varies directly with the variations in the output voltage of the power source 11. The initial voltage from the power source 11 may be considered as being $V_{DD}$ and with time the voltage will degenerate from the terminal voltage $V_{DD}$ to some lower potential as is characteristic of dry cell batteries. The width of the pulses that are provided by the regulator 10 vary in a preselected relationship in accordance with the output voltage variations from the power source 11 to maintain the desired constant RMS voltage value on the load 12.

The regulator 10 comprises a switching pulse generator coupled between the power source 11 and a switch 13 for applying the generated pulses through the switch 13 to the load 12. The switching pulse generator comprises a pulse generator 10P and a pulse width controller 10W. The pulse generator 10P is connected to the positive terminal of the power source 11 and provides the square wave output pulse at a repetition rate of 2.13 kilohertz having a width of approximately 2½ microseconds in time duration; see FIG. 3. The pulse width controller 10W is coupled to be powered directly from the power source 11. The pulse width controller 10W is coupled to be responsive to the output pulses from the pulse generator 10P. The controller 10W, as will be discussed in more detail hereinafter provides pulses that have heights that are governed solely by the output voltage from the power source 11 and widths that vary as the inverse square of output voltage from the power source 11 as it degenerates from its initial voltage $V_{DD}$, as discussed hereinabove. These pulses are applied to the switch 13 for controlling the application of the pulses to the load, device or lamp 12 to maintain the desired constant RMS voltage across the load 12. The switch 13 is conductive for periods corresponding to the width of the pulse from the controller 10W.

Now referring to FIG. 2 wherein the schematic block circuit organization of the regulator 10 is illustrated, the regulator will be described in more detail. The pulse generator 10P as implemented in a practical application may comprise a free-running multivibrator (not illustrated in FIG. 2.) that produces a square wave output of 2.13 kilohertz. The square wave output signal from the multivibrator may be coupled to a monostable multivibrator (not shown) for shaping the square wave output signals to a pulse having a preselected time duration, as illustrated in FIG. 3 and identified as the $V_P$ train of pulses.

The pulse width controller 10 comprises a resistance-capacitance network coupled across the power source 11. The resistor 15 has one terminal coupled to the positive terminal of the source 11 through the power switch 11SW and the other terminal connected to the capacitor 16. The remaining terminal of the capacitor 16 is connected to ground potential or the negative terminal of the source 11. A switching transistor 17 is coupled between the common junction of the resistor 15 and capacitor 16 and to ground potential, as illustrated. The switching transistor 17 is illustrated as an n-p-n transistor having its control or base electrode coupled to the output of the pulse generator 10P to be responsive thereto. The emitter and collector electrodes for the transistor 17 are coupled to the opposite sides of the capacitor 16 for providing a discharge path for the capacitor 16 through the transistor when it is rendered conductive. To this end the collector electrode is coupled to the junction between the resistor 15 and capacitor 16 while the emitter electrode is coupled to ground. A reference voltage generator 18 is coupled directly to the positive terminal of the source 11. The reference voltage generator 18 provides a positive output signal which is identified as the signal $V_R$. The output signal $V_R$ has the characteristic that $V_R$ has an inverse relationship to the terminal voltage $V_{DD}$ for proper RMS regulation in accordance with the present invention. It is also desirable that the inverse relationship between the source voltage and the reference voltage $V_R$ has a constant slope for implementing the circuit in an economical and simple manner. The construction and operation of the reference voltage generator 18 will be described more fully hereinafter. A comparison circuit 19 is also included within the pulse width controller 10W. The positive terminal of the comparator 19 is coupled to receive the reference voltage signal $V_R$. The inverting input or the negative input for the comparator 19 is coupled to the junction between the resistor 15 and the capacitor 16 for applying the voltage across the capacitor or the signal $V_C$ to the negative input terminal of the comparator 19. The comparator 19 provides an output signal which is the comparison of the two input signals for controlling the conduction of the switching circuit 13 through an amplifier 20. The switching circuit 13 comprises a conventional n-p-n switching transistor coupled to control the output signals from the comparator 19 to the load or lamp device 12. As illustrated, the transistor switch 13 has its emitter electrode connected directly to ground, its base electrode is connected to receive the pulse signals from the amplifier 20 and its collector electrode connected directly to the device 12. The other side of the device 12 is coupled to the positive terminal of the voltage source 11 through the manually operable switch 11SW.

With this circuit organization in mind, the operation of the regulator 10 will now be examined in more detail. It will be appreciated that with the closing of the power switch 11SW, the power source 11 will be coupled to the RC circuit comprising the resistor 15 and the capacitor 16 and that the capacitor 16 will be charged through the resistor 15. The charge on the capacitor 16 will rise in an exponential manner toward the potential of the source 11 or $V_{DD}$. The voltage on the capacitor is coupled directly to the negative input of the comparator 19. The reference voltage generator 18 will apply the reference voltage signal $V_R$ to the input of the comparator 19. The pulses from the generator 10P have been proportioned so that the conduction time of the switching transistor 17 is short compared to the time that it is in a nonconducting condition. Accordingly, the charging time for the capacitor 16 is much longer than the discharge time interval which is the same as the conduction time interval of the transistor 17. The conduction period of the transistor 17 is effective for causing the discharge of the charge stored on the capacitor 16 so that capacitor voltage $V_C$ falls to ground potential or reference potential; see FIG. 3. When the conduction period of the switching transistor 17 is terminated, the discharge period of the capacitor 16 will be terminated and the capacitor 16 will again start charging to the value of the source 11 through the resistor 15.

It is important that the period between pulses be short compared to the thermal lag of the filament to avoid filament temperature and resistance variations from pulse to pulse which would waste battery energy and decrease lamp life. In the application of the present invention to a flashing barricade light, the frequency of the pulses should be approximately 2 kilohertz.

The output of the comparator 19 is normally arranged to provide a negative output voltage for maintaining the load device 12 in a nonconductive condition with the capacitor 16 in a charged condition. When the switching transistor 17 has been rendered conductive in response to the pulse $V_P$ from the generator 10P the capacitor 16 will begin to discharge whereby the value of the charge on the capacitor 16 decreases to a value below the value of the reference voltage $V_R$ causing the output of the comparator 19 to jump to a positive potential value. The positive output signal from the comparator 19 will switch the switching circuit or transistor 13 to a conductive condition and thereby energize the device or lamp 12. When the switching transistor 13 is rendered non-conductive the capacitor again charges and when it reaches a potential that exceeds the value of the reference potential $V_R$, the output of the comparator 19 will again go negative and the load or lamp 12 will be de-energized. This relationship is graphically illustrated in FIG. 3. In examining FIG. 3, it will be noted that the positive excursions of the waveform, identified as $V_C$, oscillate around the value of the reference voltage $V_R$. In examining the $V_C - V_R$ voltage amplitudes relative to the load or lamp voltage $V_L$, it will be noted that the lamp will be in a non-conductive condition during the time intervals the capacitor voltage $V_C$ exceeds $V_R$ and in a conductive condition when $V_R$ is greater. The positive excursions of the waveform $V_C$ are representative of the charging curve for the capacitor 16 and vary in accordance with the decreasing output voltages from the source 11 with time.

Figure 2:
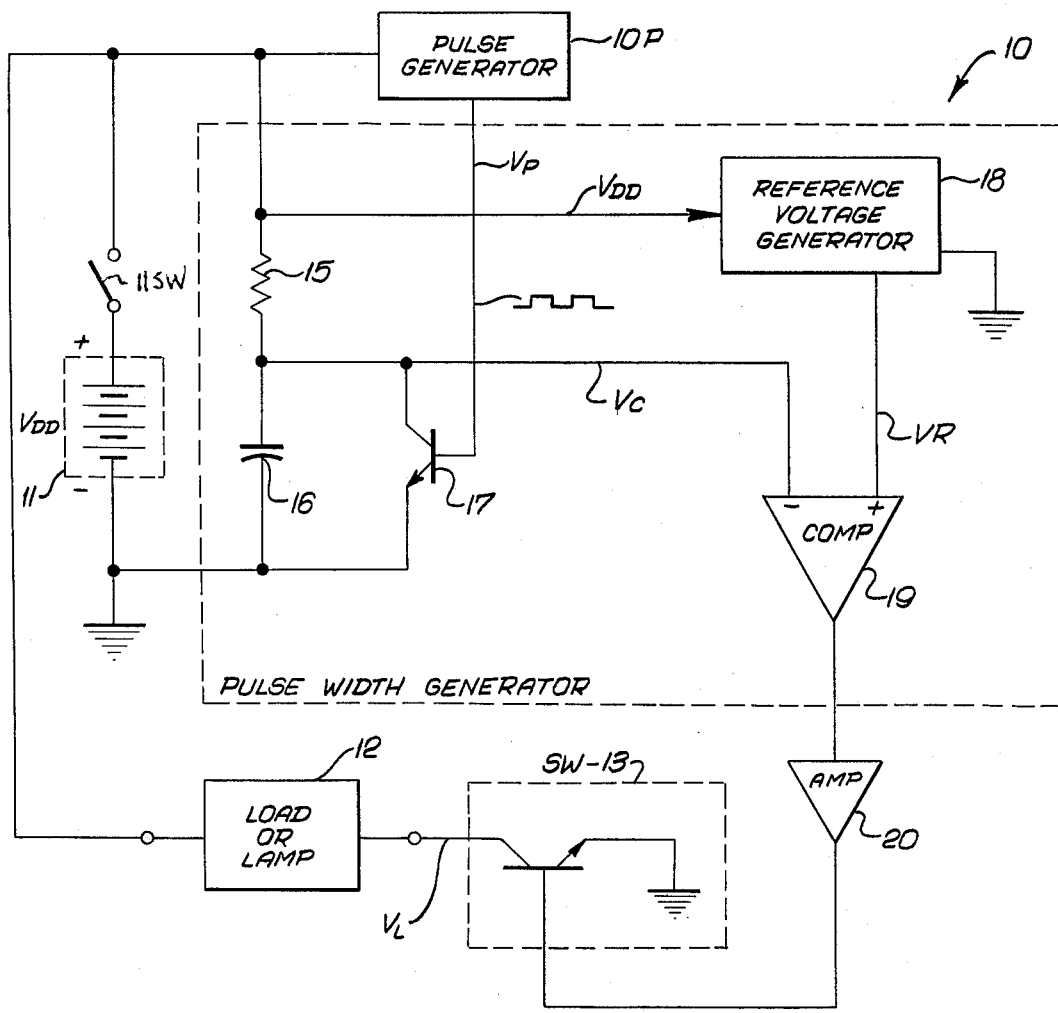
FIG. 2 is a block-schematic circuit diagram of the regulating circuit illustrated in FIG. 1.
Figure 3:
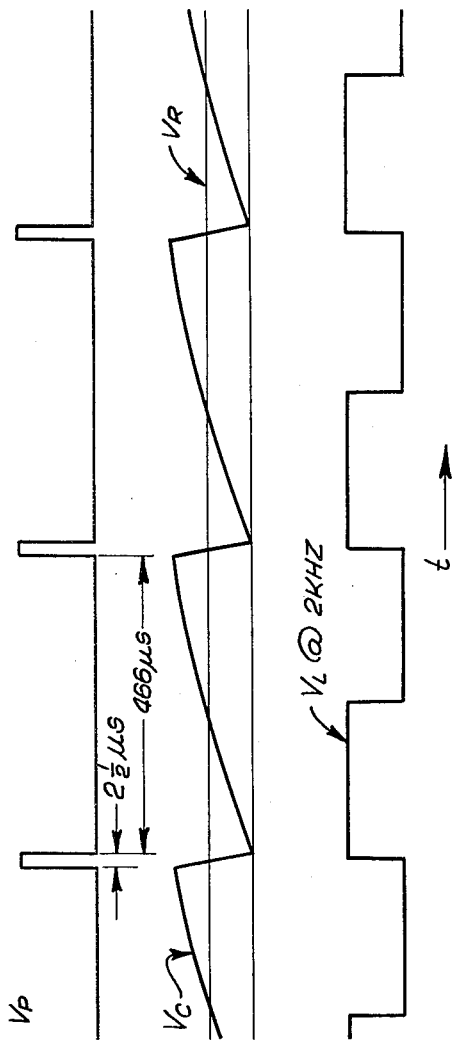
FIG. 3 is a graphical illustration of the waveforms appearing in various portions of the circuit of FIG. 2.

It should be understood that one of the important relationships for providing the desired regulatory action in the circuits described in FIGS. 1 and 2 is the relationship between the source voltage $V_{DD}$ and the reference voltage signal $V_R$. There must be an inverse relationship between these two voltages to provide the desired constant RMS voltage for the load or lamp 12.

Figure 4:
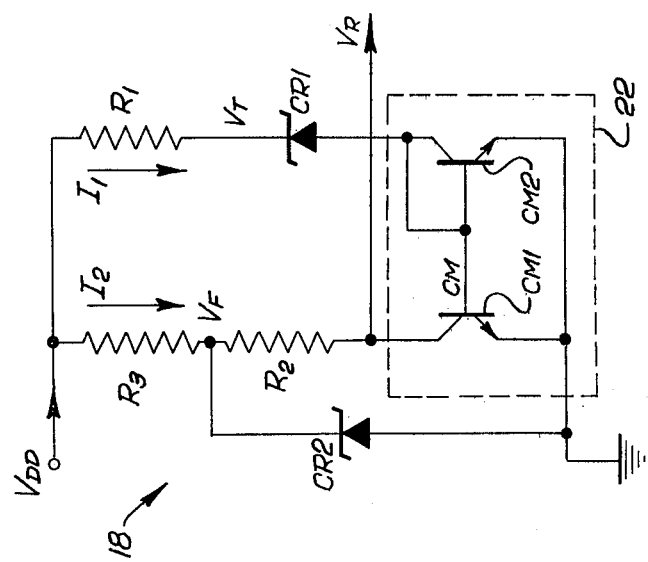
FIG. 4 is a schematic circuit diagram of the reference voltage generator utilized in the regulating circuits of FIGS. 1 and 2.

The reference voltage generator circuit 18 is illustrated in FIG. 4 is constructed and defined to provide the necessary inverse relationship between the reference voltage $V_{DD}$ and the reference voltage $V_R$. The reference voltage generator 18 as illustrated in FIG. 4 comprises two parallel branches with the resistor R1 in the right-hand branch and the resistors R2 and R3 arranged in series relationship in the left-hand branch. The resistors R1, R2 and R3 have a preselected, fixed resistance value. A Zener diode CR2 is coupled to the common junction between resistors $R_2$ and $R_3$ and ground potential. The cathode electrode of the Zener diode CR2 is connected to ground. A Zener diode CR1 and the resistor $R_2$ are each coupled to a current mirror device 22. The cathode electrode of CR1 is connected to the device 22. The current mirror device 22 is constructed to cause the currents through the two branches to be equal. The current flowing through the right-hand branch is identified as the $I_1$ current while the current through the left-hand branch is identified as $I_2$. Current mirror devices of the type described are known in the art and may be constructed from monolithic linear-integrated circuits using biopolar transistors. The current mirror device comprises a pair of transistor $CM_1$ and $CM_2$ coupled together to provide the current mirror effect. To this end, the current mirror transistor CM1 has it collector electrode connected to the $R_2$ resistor and its emitter electrode connected to ground potential. The base electrode for the transistor CM1 is coupled directly to the base electrode of the transistor CM2. The collector electrode for the device CM2 is coupled to the Zener diode CR1 and is also coupled directly to the base electrode for the device CM2. The emitter electrode for the device CM2 is coupled to ground potential, as illustrated. The reference potential $V_R$ is obtained at the junction of the resistor $R_2$ and the collector electrode for the device CM1. The potential $V_T$ is the potential at the junction between the resistor $R_1$ and the Zener diode CR1.

The analysis of this reference voltage generator circuit is as follows:

$$I_1 = \frac{V_{DD} - V_T}{R_1} \quad (2)$$

$$V_R = V_F - I_2 R_2$$

$I_1 = I_2$ by current mirroring $$V_R = V_F - \frac{R_2}{R_1} V_{DD} + \frac{R_2}{R_1} V_T$$

This equation describes the required relationship between the variables $V_{DD}$ and $V_R$ and the parameters $V_F$, $V_T$, $R_2$ and $R_1$. The general equation relating lamp voltage, battery voltage and reference voltage is:

$$V_L = V_{DD} \left\{ \frac{\ln\left[1 - \frac{V_R}{V_{DD}}\right]}{\ln\left[1 - \frac{V_{Rmin}}{V_{DDmin}}\right]} \right\} \quad (3)$$

where
$V_L$ = lamp voltage, volts RMS
$V_R$ = reference voltage
$V_{Rmin}$ = reference voltage at $V_{DDmin}$
$V_{DDmin}$ = minimum value of $V_{DD}$
$V_{DD}$ = battery terminal voltage If equation (2) is substituted in equation (3),(3) becomes $$V_L = V_{DD} \left\{ \frac{\ln\left[(1 + A) - (Z + AB)\frac{V_{DDmin}}{V_{DD}}\right]}{\ln[(1 + A) - (Z + AB)]} \right\} \quad (4)$$

where
$$A = \frac{R_2}{R_1} \quad B = \frac{V_T}{V_{DDmin}} \quad Z = \frac{V_F}{V_{DDmin}}$$

This expression has eliminated reference voltage $V_R$ and expressed lamp voltage as functions of terminal voltage and the normalized circuit parameters A, B and Z.

Figure 5:
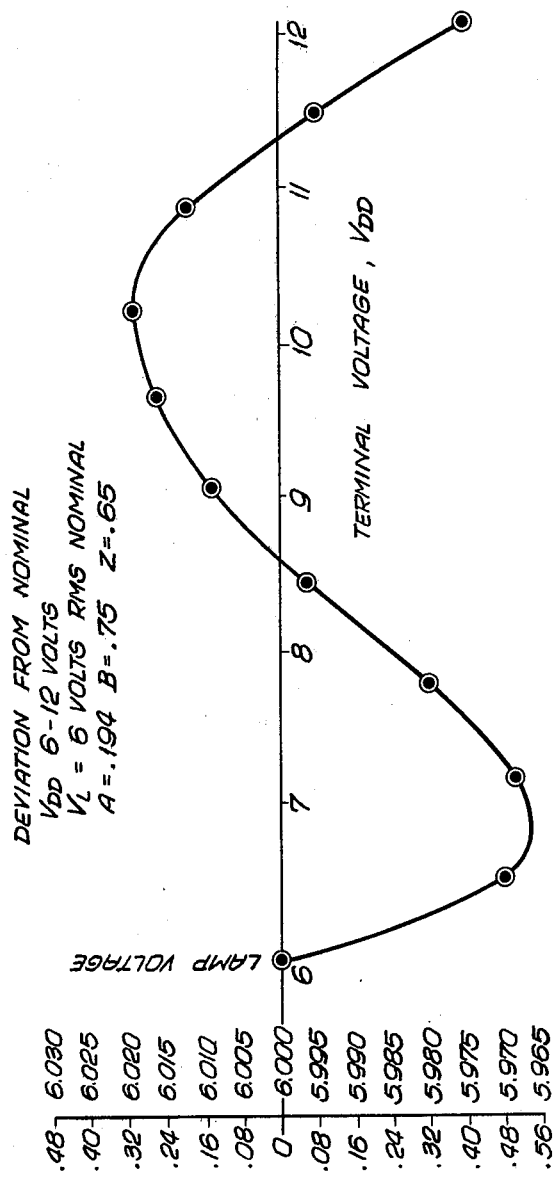
FIG. 5 is a graphical representation of the percent deviation from a desired RMS voltage value vs. terminal voltages of a power achieved with the regulating circuit of FIGS. 1 and 2.

It has been determined that optimal regulation can be achieved for values assigned to A, B and Z as follows:
$A = 0.194$
$B = 0.75$
$Z = 0.65$ Substituting these values in equation 4, with $V_{DDmin} = 6$, values of lamp voltage $V_L$ are obtained for terminal voltages from 12 to 6 volts. The results of this substitution are plotted on the graph of FIG. 5 wherein the maximum deviation or percentage of error from the nominal value of 6 volts RMS is 0.54 percent for the circuit of FIG. 2.

In the application of the concepts to the generator 18, it will be appreciated that the zener $CR_2$ holds the voltage $V_F$ constant and the zener $CR_1$ holds the voltage $V_T$ constant. This is due to the applied voltage exceeding the zener breakdown point, as is well known in the art. The linear relationship illustrated on the left-hand side of FIG. 6 is represented by the equation $$V_R = 4.77 - 0.194 V_{DD}$$

The implementation of this equation is the circuit of FIG. 4.

Figure 6:
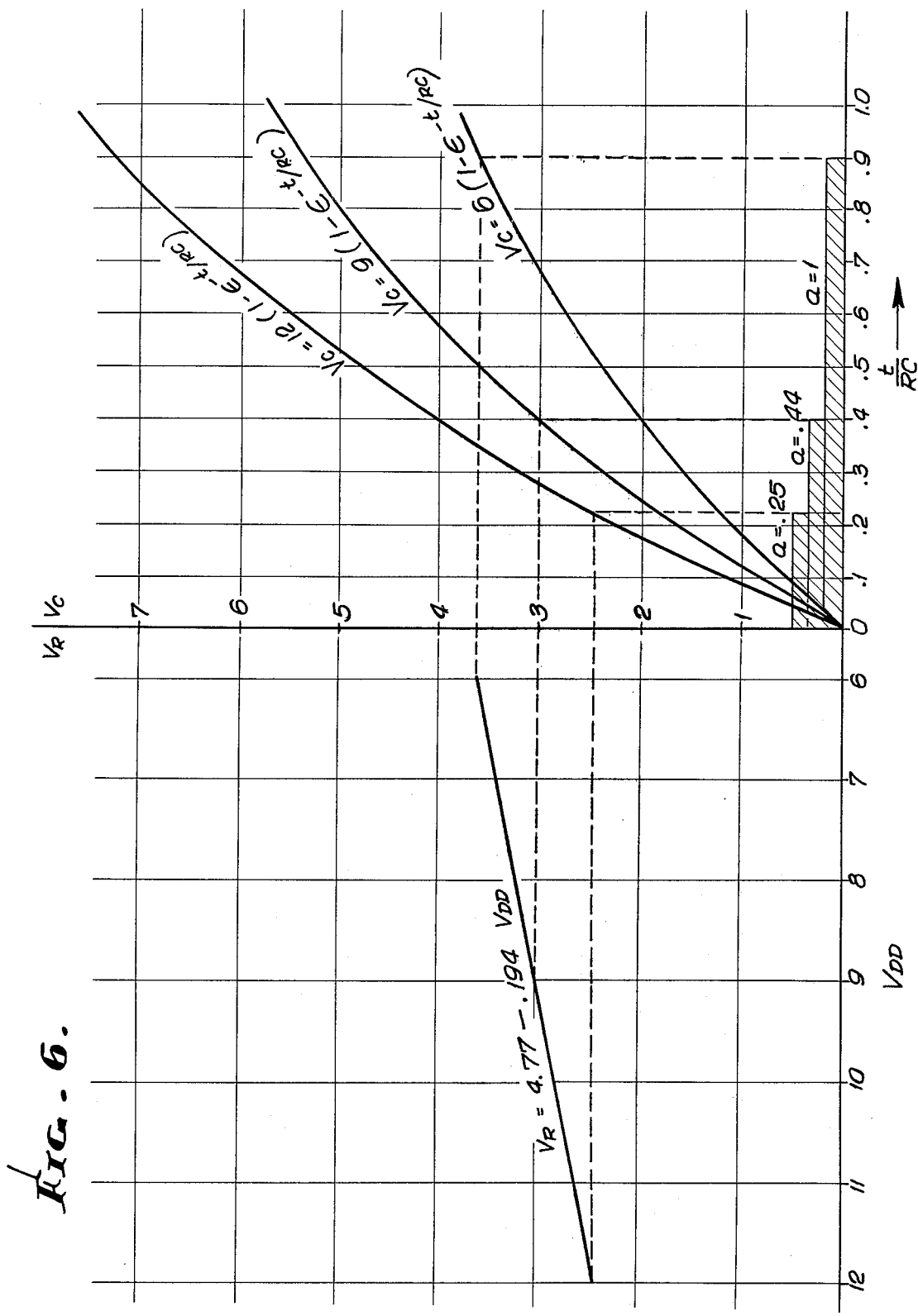
FIG. 6 is a graphical representation of the relationship of the power source terminal voltages and the reference voltages for producing the RMS voltage regulation in accordance with the present invention.

In FIG. 6 there is graphically illustrated how the $V_{DD}/V_R$ inverse relationship results in the regulation of the RMS voltage in accordance with the above-described concepts. The equation for the reference voltage, $V_R$, is plotted in the left-hand portion of FIG. 6. The curves illustrating the charging of the capacitor 16 for three values of $V_{DD}$ are plotted in the right-hand portion. To determine the value of the pulse width for any value of the independent variable $V_{DD}$, draw a vertical line from $V_{DD}$ (on the left-hand portion) to the intersection with the line defined by $V_R = 4.77 - 0.194 V_{DD}$. From this point, draw a horizontal line into the right-hand section of FIG. 6 to the intersection with the charging curve for the value o6 $V_{DD}$ chosen. Drop a vertical line to the horizontal scale t/RC. Three such dotted lines are illustrated for the terminal voltages 12, 9 and 6 ($V_{DD}$). The values of t/RC for $V_{DD} = 12$, 9 and 6 are 0.23, 0.41 and 0.92 respectively which are very nearly equal to the theoretical values of 0.23, 0.409 and 0.92 calculated from $$(t/RC = 0.92 (6/V_{DD2})^2 \quad (2)$$

If the value of t/RC at 6 volts is defined as 100 percent ontime (a = 1) then the values of percent ontime are 44 percent at 9 volts and 25 percent at 12 volts, (a = 0.44 and 0.25). These values satisfy equation 1.

Figure 7:
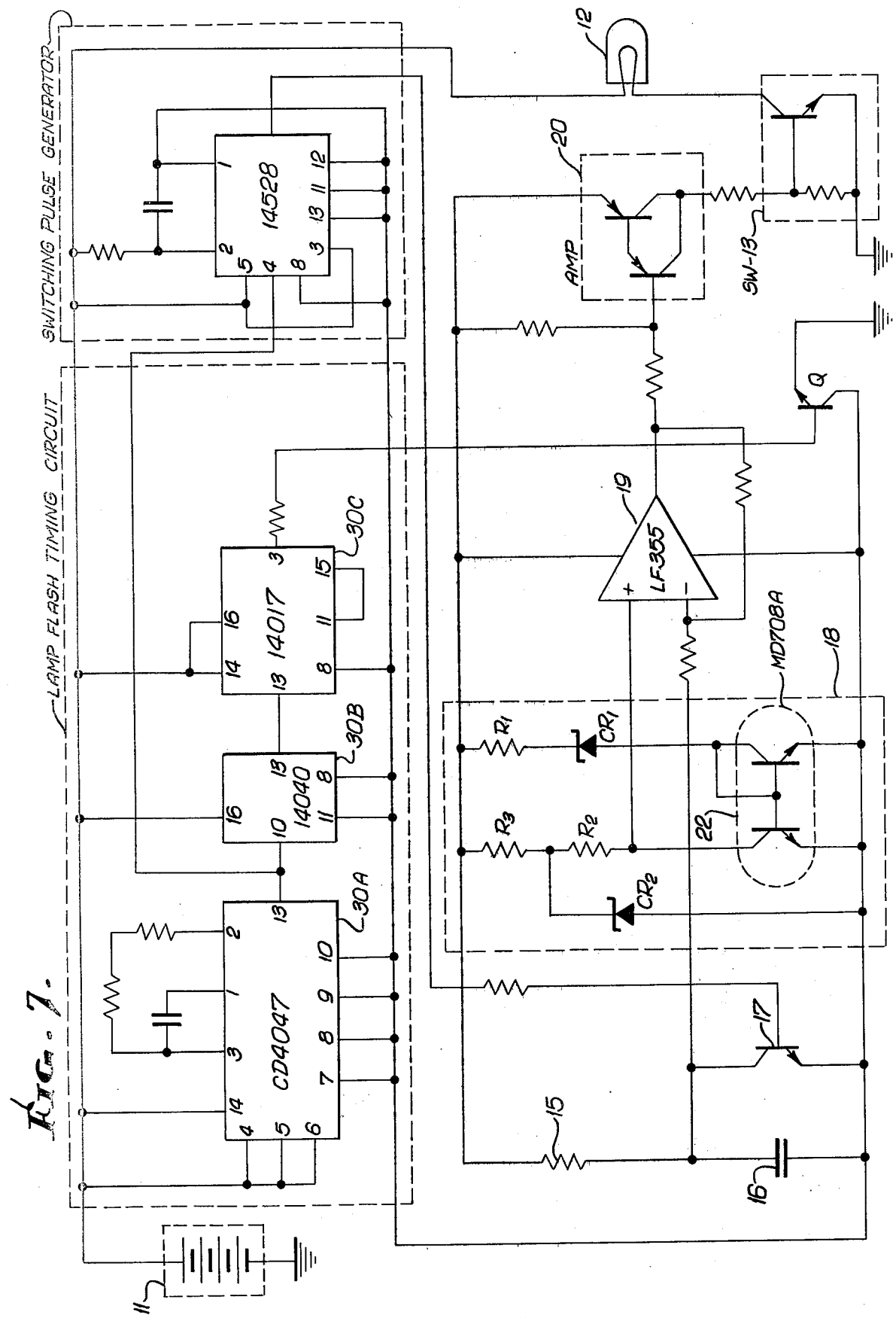
FIG. 7 is a schematic circuit diagram of the regulating circuit arranged in a practical embodiment for controlling a flashing barricade light.

When the lamp 12 is employed as a hazard warning lamp and utilized in a blinking condition or intermittently energized and de-energized in accordance with the present day hazard warning cycles, a timing circuit for controlling the flash intervals is normally provided for the lamp. The timing circuit 30 is illustrated in FIG. 7 as coupled between the power source 11 and the regulating circuits for controlling the coupling and decoupling of the source 11 to the regulating circuit 10. A practical embodiment of the regulating circuit 10 incorporating a lamp flash timing circuit is illustrated in FIG. 7 that utilizes commercially available integrated circuits and components. The flashing timing circuit 30 comprises an integrated circuit element 30A which may consist of an RCA monostable/astable mutivibrator Model CD 4047. As illustrated, the element 30A is connected in an astable multivibrator free-running mode providing output pulses at 2.13 kilohertz. The output pulses are derived from pin 13 of the element 30A and coupled to a dividing element 30B. The element 30B may be a motorola Model 14040 decade counter/divider integrated circuit for providing an output signal at 8.3 hertz in response to the input signal from element 30A. The output signal from the element 30B is coupled as the input signal to the element 30C. This element 30C may be a 140173 (divide by 9) element for dividing the signal down to provide an output signal at preselected time intervals for energizing the lamp 12 in accordance with the desired flash rate. For this purpose, the output of the element 30C of the circuit 30 is coupled to a switching transistor Q1. The transistor Q1 is coupled between the positive terminal of the power source 11 and the positive terminal of the regulator 10 for controlling the application of the power to the regulating circuits. The output signal of the element 30A is also coupled as the input signal to a monostable multivibrator for controlling the time duration of the switching pulse to the transistor 17 as described hereinabove. The monostable element may be a Model 14528 type of device to provide a 2½ microsecond pulse. The remaining portion of the circuit corresponds to the elements described hereinabove. The current mirror device 22 is illustrated in FIG. 7 as a commercially available Motorola MD708A element.

What is claimed is:
1. Apparatus for maintaining a substantially constant RMS voltage across a load device powered from a power source having a decreasing output voltage with time comprising
   means adapted to be coupled to said power source in parallel circuit relationship for providing a reference output voltage signal that has an inverse relationship to the voltages of the power source and with a substantially constant slope, a serial resistor-capacitor network having a junction between the resistor and capacitor and adapted to be coupled to said power source in parallel circuit relationship therewith to permit the capacitor to be exponentially charged from said source through the resistor, first switching circuit means adapted to be coupled to said power source through said serial resistor and including a parallel circuit path connected to opposite sides of the capacitor and being normally arranged in a nonconductive condition and to be automatically rendered conductive at preselected time intervals for discharging the capacitor by means of the parallel circuit path during the conductive time intervals of the parallel circuit path, the time intervals the parallel circuit path is conductive is short relative to the nonconductive time intervals, pulse generating means adapted to be coupled to said power source for generating pulses of a preselected repetition rate and a preselected short pulse width and being coupled to said first switching circuit means for rendering said conductive in response thereto, comparison circuit means coupled to be responsive to said reference output signal and to the signals at the junction between the resistor and the capacitor for periodically providing output pulses having pulse widths that vary as the inverse square of the output voltages from said source only when the signals at said junction are less than the amplitude of the reference output signals, and second switching circuit means coupled to be responsive to the output pulses from said comparison circuit means to be rendered conductive thereby for the time duration of said output pulses, and a load device adapted to be coupled to said power source to be powered therefrom through the second switching circuit means during the time intervals the second switching means is rendered conductive in response to said output pulses.

2. Apparatus for maintaining a substantially constant RMS voltage across a load device powered from a power source having a decreasing output voltage with time as defined in claim 1 comprising means coupled between the power source and said apparatus for causing the load device to be energized and de-energized for preselected time intervals and to render the apparatus operative during the time intervals the load is energized.

3. Apparatus for maintaining a substantially constant RMS voltage across a load device powered from a power source having a decreasing output voltage with time as defined in claim 1 wherein said second switching means is adapted for applying power pulses to the load device to maintain a substantially constant value of RMS voltage across the load device and provide power pulses at approximately 2 kilohertz.

4. Apparatus for maintaining a substantially constant RMS voltage across a load device powered from a power source having a decreasing output voltage with time as defined in claim 3 wherein the regulation of the RMS voltage value is within one percent.

5. Apparatus as defined in claim 1 wherein the reference voltage means comprises a current mirror device.

6. Apparatus for maintaining a substantially constant RMS voltage across a load device powered from a power source having a decreasing output voltage with time comprising means adapted to be coupled to said power source for generating pulses having a preselected repetition rate and pulse width, means adapted to be coupled to said power source for providing a reference voltage having an inverse relationship to the voltages of said source with a substantially constant slope, a resistance-capacitance network adapted to be coupled across the power source for exponentially charging the capacitor therefrom;

switching means coupled to be responsive to the pulse generating means to be rendered conductive in response to a pulse coupled thereto, said switching means being coupled in parallel circuit relationship with the capacitor to provide a circuit path for discharging the capacitor during the conductive intervals of the switching means and thereby permitting the capacitor to be charged during the nonconducting intervals of the switching means, the charging and discharging of the capacitor providing an oscillating signal having amplitudes that vary with the decreasing output voltages of the power source and exhibiting reversals in direction regularly and continuously and with the amplitudes varying about the voltage level of the reference voltages, comparison circuit means coupled to be responsive to the output signals derived from the capacitor and from the reference voltage generator for providing output pulses having pulse widths that vary as the inverse square of the output voltages, switching means coupled to be conductively responsive to said output pulses for the time duration of the pulses for applying pulses to a load to be energized therefrom, and a load device adapted to be coupled to the power source to be powered therefrom and in series circuit relationship with said last mentioned means to be energized from the power source during the conductive time intervals of said switching means.

7. Apparatus for maintaining a substantially constant RMS voltage across a lamp powered from a power source having a decreasing output voltage with time, comprising voltage reference generating means comprising a current mirror device adapted to be coupled to said power source for providing an output signal having an inverse voltage relationship with the voltages from said power source, energy storage means adapted to be coupled to said source to be charged therefrom, a lamp adapted to be coupled to the source to be energized therefrom, switching circuit means coupled to said energy storage means for periodically discharging said energy storage means at a preselected fixed switching rate to thereby provide an oscillating signal from said storage means, means for sensing the relative amplitudes of the output signal from said voltage reference means and said oscillating signal from said storage means for switchably coupling the power source to the lamp for regulating the luminous flux output of the lamp to maintain the flux output substantially constant over a range of voltages capable of sustaining the constant flux by switching the power source to the lamp on and off at a preselected rate, the pulses being proportioned in height and width for maintaining a substantially constant RMS voltage value on the lamp.

8. Apparatus for maintaining a substantially constant RMS voltage across a lamp as defined in claim 7 wherein said energy storage means is a capacitor.

9. Apparatus for maintaining a substantially constant RMS voltage across a lamp as defined in claim 18 wherein the power source is substantially coupled to the lamp at a rate so that the period between pulses is short relative to the thermal lag of the lamp filament for avoiding filament temperature and resistance variations.

10. Apparatus for maintaining a substantially constant RMS voltage across a lamp as defined in claim 8 including timing circuit means for controlling the time intervals that the lamp is energized and de-energized to cause the lamp to flash on and off at a preselected rate and flash period.

11. Apparatus for maintaining a substantially constant RMS voltage across a load device as defined in claim 1 wherein said parallel circuit path comprises a transistor switching circuit normally arranged in a nonconductive condition and to be rendered conductive in response to the pulses from said generator for the time duration of the pulses to thereby provide an oscillating signal at the junction of the resistance capacitance network having amplitudes that vary with the decreasing output voltages of the power source.

12. Apparatus for maintaining a substantially constant RMS voltage across the load device as defined in claim 11 wherein said transistor switching circuit comprises a field effect transistor.

* * * * *

UNITED STATES PATENT OFFICE
CERTIFICATE OF CORRECTION

Patent No. 4,230,970             Dated   October 28, 1980

Inventor(s)   Gene B. Potter and Martin H. Jurick

It is certified that error appears in the above-identified patent and that said Letters Patent are hereby corrected as shown below:

Col. 3, line 28 (in application page 6, line 10)

"$(V_{DD2} 32\ 6)$" should read -- $(V_{DD2} = 6)$ --

Col. 7, line 67, delete "o6" and substitute -- of --.

Col. 9, line 22, delete "said" and substitute -- same --.

Col. 11, line 8, delete "18" and substitute -- 8 --.

Col. 11, line 9, delete "substantially" and substitute -- switchably --.

Signed and Sealed this

Twenty-seventh Day of October 1981

[SEAL]

Attest:

GERALD J. MOSSINGHOFF

Attesting Officer    Commissioner of Patents and Trademarks